UNITED STATES PATENT OFFICE.

GEORGE JOHNSON HUESTIS, OF HALIFAX, NOVA SCOTIA, CANADA.

MILK PRODUCT.

1,063,687.

Specification of Letters Patent.

Patented June 3, 1913.

No Drawing.

Application filed January 5, 1912. Serial No. 669,594.

*To all whom it may concern:*

Be it known that I, GEORGE J. HUESTIS, a subject of the King of Great Britain, and a resident of Halifax, in the Province of Nova Scotia and Dominion of Canada, have invented a new and Improved Milk Product, of which the following is a full, clear, and exact description.

My invention relates generally to food products and more particularly it is directed to a solidified milk or cream cake containing certain ingredients, the composition being such and the process through which the milk or cream is put being designed to permit the cake to revert, when dissolved in warm or hot water, to a delicious milk or cream.

The object of my invention is to provide a new and useful milk product which is especially adapted for use in hot or cold climates and for use in the army and navy or expeditions or sailing crafts or in any place where it is desired to carry a supply of milk for a longer or shorter time; the product is also equally efficient for domestic use both for use on the table and also in cooking.

A further object of my invention is to provide milk or cream in the form of a cake which may be kept in such form indefinitely and which when dissolved in warm or hot water will revert to its natural state.

A still further object of my invention is to provide a milk product made up especially of milk or cream, together with certain other substances to be hereafter set forth, the use of these substances depending on whether the milk after reverting to its original condition is to be sweetened or unsweetened; such a form of milk will keep indefinitely at various temperatures and may be produced at a low cost and if in a compact form may be transported great distances.

In carrying out the objects of my invention I make use of milk, cream, or skimmed milk, or any mixture of any two or three of these substances, certain other substances being added whereby the milk may be transformed into the solid state, certain of these substances being used where the resulting product is to be in either the sweetened or the unsweetened form, other substances being necessary only when the milk or cream is desired in the unsweetened form.

A desirable amount of milk or cream, or skimmed milk, or a mixture of any two or the three of these substances is reduced by evaporation carried on in a suitable vacuum, aided by agitation, until the milk or the mixture assumes a pasty consistency and becomes somewhat translucent and yellowish-white in color. It is then removed from the vacuum device and is placed in another receptacle to which heat has been applied; a desirable amount of sugar and salt are then added to the mixture and the whole is then grained, creamed, or set up. Each of these terms means practically the same thing but I deem it necessary to use the three of them to describe the condition to which the mixture is brought and from dissolution of which a good sweetened milk will result.

The graining, creaming, or setting up, is a certain process from which a change in the structure of the product results and is effected as follows: The mixture containing the sugar and salt, together with the milk or cream, or skimmed milk, is carefully watched at the desired temperature and after being subjected to certain tests is then poured into the receiving mold or into molds of different sizes and is left undisturbed for several hours where it grains, creams, or sets up, or rather, it completes this step since it starts to grain or cream before being removed from the heat. This creaming or setting up can be detected by watching the material, the grains being seen in the forming process and the right degree of graining ascertained by placing some of the material between the thumb and a finger and seeing it stretch somewhat like a sheet of glass. While the right degree of graining or creaming or setting up can be learned by experience, the process may be said to be effected when the mixture assumes the consistency of fudge of candy mixture and looks somewhat like this substance. As before stated, the mixture is poured into proper molds where the graining or setting up process is completed;

the substance may be also poured into molds of different sizes whence it may be removed after cooling and may be cut into cakes or may be wrapped without cutting in boxes of any material such as wood or tin, etc., and made ready for the market. While other substances may be added to the milk or cream or the mixture thereof in order to bring about this process of graining or creaming, the use of sugar and salt is preferable and it is also advantageous to mix with the natural milk or cream as few other substances as possible; such other substances as gelatin or glucose may be mixed with the sugar and used to effect this purpose, in fact, the different kinds of sugar, such as rice sugar, raisin sugar, or maize sugar may be used but the resulting mass which cools into slabs or cakes is not the result of creaming or graining which is the essential feature of my invention.

It may be desirable in some instances to provide a milk product which is unsweetened, the product, however, being equally adapted for everyday use and which may be also provided in a solidified form which will dissolve into a good fluid milk. In order to provide such an unsweetened milk I make use of a mixture of milk or cream, or skimmed milk, or any mixture of two or of the three of these substances, together with sugar, salt, and some honey and glucose. The desirable amount of glucose is neutralized so that any free acid or alkali therein may be removed in order to prevent curdling of the milk when the glucose is added to it, a small quantity only of glucose being necessary to gain the consistency desired.

In the evaporation of the milk a certain amount of sweetness and the salty taste leaves it; in order to regain these qualities of the milk a little honey, sugar and salt is added thereto. The honey performs another function in that it keeps the ingredients in proper suspension. When these ingredients are put together at the proper temperature and the mixture evaporated in the vacuum pan it is removed therefrom and heated in another receptacle, being taken from this receptacle at the proper time and allowed to set in a mold or is cooled and cut into pieces of the size and shape required; this unsweetened milk resembles the caramel of candy manufacture in appearance while the sweetened milk product resembles the fudge candy manufacture; these two substances, caramel and fudge, are easily distinguished from each other and by drawing the analogy to the sweetened and unsweetened form of the milk product it is believed that the difference in the structure of this product will be apparent. This mixture of substances from which the unsweetened milk product is formed may be made into a sweetened milk substance by the addition of more sugar or honey but the large percentage then present of these materials does not result in the fine finished article that the grained or creamed milk heretofore described provides; the unsweetened milk material having these substances therein cannot be so readily grained, set up, or creamed.

My milk product, whether made of milk or cream, or skimmed milk, will dissolve into milk or cream, or skimmed milk, more or less sweet according to the state in which the substance has been put; while the product may be composed of the substances herein set forth, it is also obvious that in order to provide a healthy, nourishing and attractive milk food or product, nuts, seeds cornstarch, or arrowroot may be added to the product.

The milk may be treated by either of the aforementioned two processes, ("sweetened or unsweetened")—into these is put a strong essence of coffee, tea, cocoa, chocolate, or any essence, with which it is desirous to use milk in conjunction therewith, the result produced, by the addition of hot water, dissolving the product into a drink of the abovementioned coffee, tea, cocoa, or chocolate, etc.

When desired for table use with tea or coffee, it is necessary only to drop the "cup size" cake of the solidified milk into a cup of tea, coffee, cocoa, etc., or hot water may be added to the solidified milk, whereupon it will dissolve, this dissolution being aided by breaking up with a teaspoon, the milk product being sweetened primarily, or sweetening may be added to the drink after or during the dissolving of the cake.

Having thus described my invention, I claim as new, and desire to secure by Letters Patent:—

1. A milk product consisting of concentrated milk in the form of a cake, containing an amount of honey, glucose, and sugar.

2. The herein described milk cake containing milk, to which sugar, glucose, and honey have been added.

3. The method herein described of producing a milk cake which consists in reducing the volume of milk, adding sugar thereto and graining the milk, and allowing the mass to cool in suitable molds.

4. The method described herein of producing a milk cake which consists in reducing the volume of the milk by evaporation, adding thereto some sugar and salt, and graining the mixture, and then allowing it to cool, whereby a grained product resembling the structure of fudge of candy making is obtained.

5. The herein described method of producing a milk cake, which consists in reducing the volume of the milk by evaporation, heating the reduced mass, and adding sugar and salt thereto, whereby the mass becomes grained.

In testimony whereof I have signed my name to this specification in the presence of two subscribing witnesses.

GEORGE JOHNSON HUESTIS.

Witnesses:
 THOS. G. CAMERON,
 ALBERT G. EBERT.